July 29, 1969  F. SIRAGUSA  3,457,927
FILTER
Filed Feb. 20, 1968  2 Sheets-Sheet 1
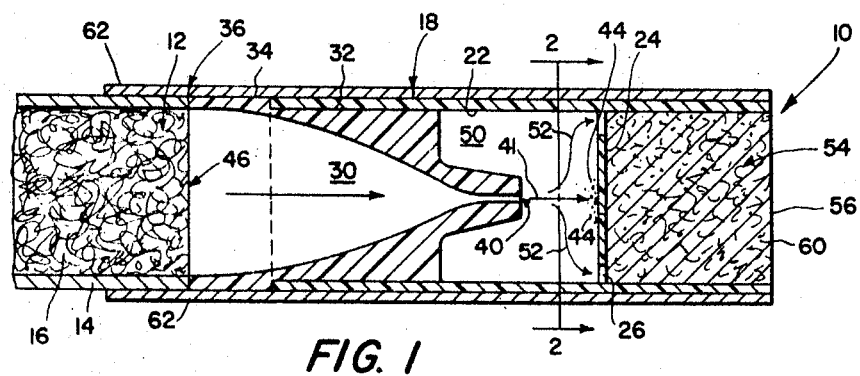
FIG. 1
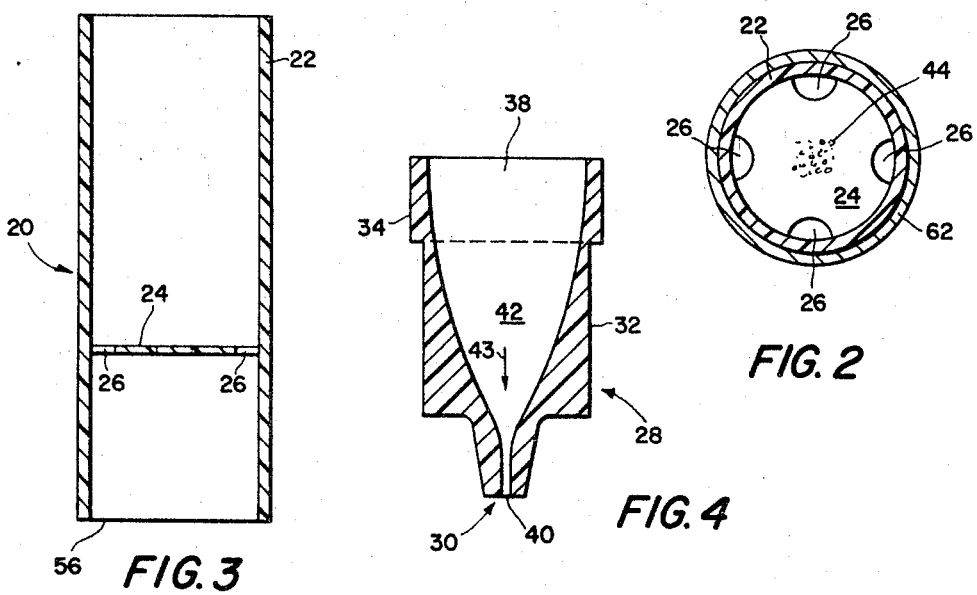
FIG. 3  FIG. 4  FIG. 2
FIG. 5
INVENTOR.
FRANK SIRAGUSA
BY Edward Halle
ATTORNEY.

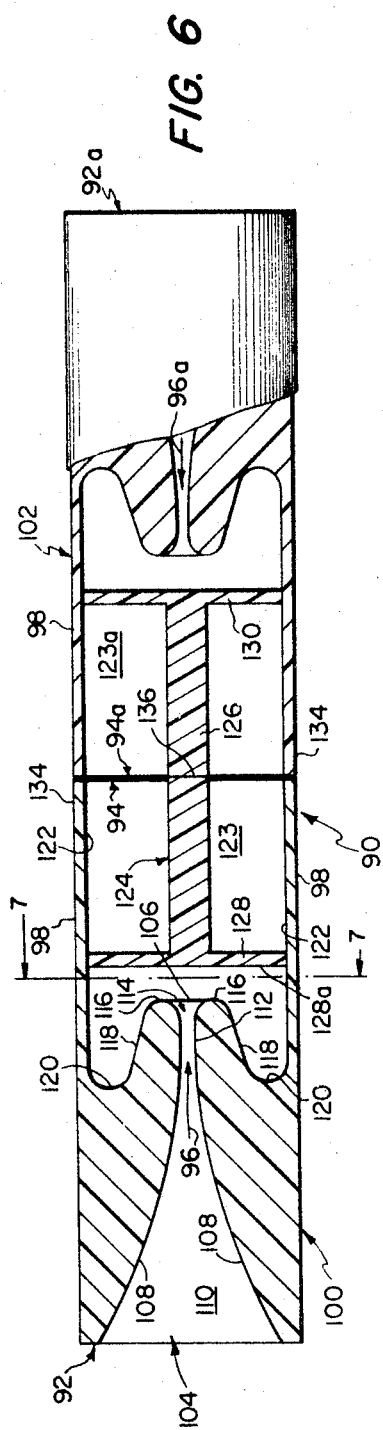

United States Patent Office 3,457,927
Patented July 29, 1969

3,457,927
FILTER
Frank Siragusa, 4 Elmwood Court,
Westbury, N.Y. 11590
Continuation-in-part of application Ser. No. 589,432,
Oct. 25, 1966. This application Feb. 20, 1968, Ser.
No. 706,829
Int. Cl. A24d 1/04, 1/06; A24f 13/06
U.S. Cl. 131—10.5                            8 Claims

ABSTRACT OF THE DISCLOSURE

A filter for a gas flow system, and in particular, its application to a cigarette, with the filter comprising that end of the cigarette structure which is placed in the mouth of the smoker. The filter includes a nozzle chamber whose gas entry portion has symmetrical wall means curved convexly toward the center of the filter body. The walls extend in a downstream direction to a narrow throat portion and then reversely curve to form the nozzle exit portion. As the walls continue in an upstream direction they gradually reversely curve to form an annular wall which merges into the inner surface of the wall structure of the filter body. Transverse baffle means are located downstream of the nozzle exit portion within the filter body. The chamber is adapted to cause the smoke or gas to move at high speeds through the nozzle and then to be dispersed together with particles contained therein toward the baffle, resulting in a smooth flow of smoke and substantially reduced turbulence within the filter body.

---

This application is a continuation-in-part of application Ser. No. 589,432 filed Oct. 25, 1966.

It is an object of this invention to provide an improved filter, economical to manufacture, which will be efficient in removing undesirable content from the gas or smoke and yet which will permit the gas or smoke to flow freely; and in the case of tobacco smoke, to permit the purified smoke to be enjoyed with a minimum amount of obstruction from the filter system.

The object of the invention is accomplished by providing a filter having a nozzle directed against a baffle. The nozzle has an internal configuration designed to cause smoke flowing through the filter (either by reason of suction or blowing) to increase in velocity so that as it leaves the nozzle it will be flowing at high speed, causing impurities contained therein either to strike the baffle and adhere to the baffle, or fall back into the filter, or to be atomized by the action of the nozzle and related parts to be sprayed toward and dispersed against the baffle permitting the smoke to continue around the baffle and out of the system without that portion contained within the smoke which will either adhere to the baffle or fall back into the filter.

I achieve these objects with the invention illustrated in the accompanying drawings in which:

FIG. 1 is a medial cross section of a cigarette incorporating my filter, with parts of the cigarette cut away;

FIG. 2 is a sectional view as seen along the lines 2—2 in FIG. 1;

FIG. 3 is a medial cross sectional view of the smoke passage portion of the filter including the baffle section;

FIG. 4 is a medial sectional view of the insertable nozzle portion of the filter;

FIG. 5 is a view partially in section, and partially in diagram, showing at dotted lines variations in configuration of the internal shape of the nozzle;

FIG. 6 is a cross sectional view of a pair of filters in a filter assembly unit;

FIG. 7 is a sectional view along the lines 7—7 in FIG. 6;

FIG. 8 is an elevational view of a baffle assembly;

FIG. 9 is a sectional view along the lines 9—9 in FIG. 8;

FIG. 10 is an elevational view of a pair of cigarettes attached to a filter assembly unit; and FIG. 11 is a sectional view along the lines 11—11 in FIG. 10.

Similar numerals refer to similar parts throughout the several views.

Referring now to FIG. 1 of the drawings, I show the mouthpiece end 10 of a cigarette 12. The cigarette is made of the usual tubular construction having a wall of cigarette paper 14, filled with tobacco 16. At the mouthpiece end 10 there is a filter 18.

Reference to FIGS. 3 and 4 will show that the filter is comprised of a first assembly 20 comprising a tubular body portion 22, and a baffle means such as a transverse baffle 24. The baffle has one or more openings 26. There is a second assembly 28 comprising the nozzle 30. The second assembly 28 has a circular wall 32 having an enlarged end portion 34. The external diameter of wall 32 is just large enough to fit snug to the internal diameter of wall 22, and the external diameter of wall portion 34 is substantially equivalent to the external diameter of wall 22 so that when second assembly portion 28 is fitted into the first assembly portion 20, the completed filter structure 18 will have the appearance as shown in FIG. 1 of the drawings.

The filter 18 can then be attached to the cigarette body portion 12 by any means known to the art, such as adhesive means as indicated at reference numeral 36, or by any other means. Another means of fastening the filter tip 18 to the cigarette 12 would be to line up the cylinder of the tip 18 with the cylinder of the cigarette 12 and place a paper roll 62 around the tip 18 and the cigarette 12 with a portion of the paper roll 62 covering the point of juncture so that the paper roll 62 will essentially form a third cylinder or tube gripping the filter and the cigarette together. The paper tube or roll 62 may be fastened to the other components by means of an adhesive or any other suitable means.

The nozzle portion 30 has an internal configuration providing a relatively wide entry portion 38 and a relatively narrow exit portion 40 with the nozzle chamber 42 between the entry and exit being graduated in size from wide to narrow in the normal direction of gas flow as indicated by the arrow 43 in FIG. 4.

Reference again to FIG. 1 will show that the baffle means 24 is positioned relative to the narrow exit portion 40 of the nozzle so that the flow of gas indicated by the arrow 41 in FIG. 1 will be directed against the baffle in the first instance. Any impurities such as solid particles 44 will be directed against the baffle 24 at relatively high velocity by the fluid stream of the gas or smoke. The smoke which enters the beginning of the enclosed passage means of the filter at area 46 continues through the enclosed passage of the filter through the nozzle means 30 and into a central portion of the enclosed passage 50 of the filter until it hits or is impeded by baffle 24. Then the smoke must change its direction as partially indicated by arrows 52 and leave central portion of passageway 50 through openings 26 into portion 54 of the filter passageway and out through the exit portion of the filter such as mouthpiece means 56. The central portion of passageway 50 thus also serves as a trap means in which the impurities removed from the smoke are trapped.

In the case of the cigarette filter structure shown herein, the gas or smoke is caused to move through the filter by suction of the mouth of the user (not shown) drawing on the cigarette at mouthpiece end 56.

The use of the term "smoke" in this specification shall include the general term "gas," the term "smoke" being used as being more in conformity with the specific application of the filter of the invention as described herein.

In another type of system, the gas may be pushed or blown through the filter through the gas entry portion of the passageway of the filter at area 46 rather than by sucking action, and the filtered smoke will exit from the filter through the exit portion as designated at reference numeral 56.

The filter as described herein has been shown to be made in two parts comprising the first assembly 20 and the second assembly 28. This is made as a two-part filter because of the process of injection molding by which it is made. The filter is molded out of any suitable plastic known to the injection molding arts. A suitable mold or molds are made to mold the first assembly 20 as illustrated in FIG. 3 and also the second assembly 28 as illustrated in FIG. 4. Second assembly 28 is then snug fitted into first assembly 20.

The filter can be made in any other manner which will produce the configuration necessary to its useful operation. In addition, the nozzle chamber 42 may be in various configurations and shapes providing that the entry portion 38 is relatively wider than the exit portion 40. Three different shapes of nozzle chambers 30 are shown by means of the dotted lines in FIG. 5, and any other shapes may be used which can be included within the limits of the size of the invention having the relative differences in entry and exit ports and the graduated side wall. The term "graduated" when used herein shall mean a gradual narrowing of the chamber 30 which may be in even increments or in varied increments and which may be regular or irregular, it being the intention to provide a chamber 30 having a wide entry and a narrow exit, and having an internal configuration which will produce a great increase in velocity between the entry and exit ports for the purposes of the invention as set forth herein.

I have found that the average cigarette is between ¼ and 5/16 of an inch in diameter, and I, therefore, make my filter, when it is designed for use with a cigarette, about the same outside diameter as the outside diameter of the cigarette paper in which the average cigarette is rolled. I find that a nozzle 30 having an exit port 40 within the range of .020 to .040 inches in internal diameter spaced about ⅛ of an inch away from the baffle 24 will give proper results. This may be varied about 1/32 of an inch in either direction, toward or away from the baffle. These measurements are proper for a form of invention made as a cigarette filter and as illustrated in the drawings. In such a form of the invention, the filter tip represented by reference numeral 18 would be approximately ⅞ of an inch long, being about ⅝ of an inch from the beginning of the filter at reference numeral 46 to the baffle 24, with end passage 54 being approximately ¼ of an inch long. If it is desired to increase the length of the filter tip, this may be done by increasing the length of the end passage 54. These parameters are given to show a preferred form of the invention and may be varied within the workable limits of the device. They may also be varied proportionately to the size of the filter when filters of either larger or smaller sizes are made.

While the filter is shown to have a tubular construction, it may be octagonal or have any other cross sectional shape which does not interfere with the wide entrance, graduated sized chamber and narrow exit of the nozzle.

The end passage 54 may provide spacing between the baffle 24 and the exit port 56. The spacing in the end passage 54 may be clear or it may contain further filtering means such as mechanical filter 60. The mechanical filter 60 may be comprised of either cotton or cellulose or charcoal or any other type of mechanical filter adapted to take impurities out of a gas or any combination of such materials.

In FIGS. 6 through 11 of the drawings, I illustrate a filter assembly 90 made in accordance with the invention. The filter assembly 90 contains a pair of filters 100 and 102 held together by means of a baffle assembly 124 which comprises a center post 126 and a pair of baffle means 128 and 130. Filter 100 has an upstream end 92 and a downstream end 94, and the gas flow in filter 100 is adapted to flow normally in the direction of arrow 96. Filter 102 has an upstream end 92a, a downstream end 94a, and gas flow in filter 102 is normally adapted to flow in a downstream direction as illustrated by arrow 96a. The references to filters 100 and 102 and to the direction of gas flow as illustrated by arrows 96 and 96a is for purposes of clarity in defining the structure of the filters of the invention in this specification and in the claims hereinbelow, it being understood that the normal gas flow during filtering operation would be form the wide mouth entry 104 toward the nozzle means 106 of a first chamber 110. It is to be understood that filters 100 and 102 are identical in structure with the upstream ends on the outside as shown in FIG. 6 and the downstream ends in facing abutment at the center of FIG. 6.

The purpose of the dual assembly is to provide a filter unit assembly which may be compatible to present day cigarette making machines wherein the cigarettes are manufactured in end-to-end tandem relationship and then cut to make two separate cigarettes. FIG. 10 shows a pair of attached cigarettes about to be cut in a final stage of manufacture.

In the filters as illustrated in FIGS. 6 through 11 of the drawings, I have provided a particular configuration for the first, or nozzle, chamber 110 which corresponds to nozzle chamber 30 of FIG. 1 of the drawings. However, in first chamber 110 as shown in FIG. 6, there is a symmetrical curve 108 which curves inwardly and convexed extending in a downstream direction from wide mouth entry 104 toward a throat portion 112. I have found that in a normal cigarette having a diameter of approximately 0.305 of an inch between outer wall structure portions 98, the curve 108 as shown in FIG. 6 is preferred to be on a radius of 1.025 inches. The filter body portions 100 and 102 would normally be 0.700 of an inch in length. The throat portion 112 will be the narrowest part of the nozzle system, and its preferred measurement is 0.021 of an inch which would be at point shown by refernce numeral 112. Nozzle exit portion 106 starts to widen out downstream from the narrowest throat portion 112 as indicated at reference numeral 114. This is accomplished by reversing the curve 108 after throat portion 112 to form an annular lip 116 convexed downstream. The curve of lip 116 is preferred on a radius of 0.025 of an inch. The symmetrical curve straightens out along line 118 to run back toward the upstream end of the filter and toward the outer wall structure of the filter, and then a gradual second or re-reverse curve on a radius of 0.032 of an inch is formed at reference numeral 120 to provide an inner annular wall which merges into the inner surface 122 of said outer wall structure 134. The preferred distance between the limits of curves 116 and 120 is in the order of 0.125 of an inch, and the normal distance between the exit line of nozzle exit means 106 and downstrem end 94 is 0.200 of an inch.

Inner wall 122 is substantially parallel to outer wall structure 98 and continues until the downstream end 94 or 94a as the case may be to form a second, or baffle chamber 123. The inside diameter between walls 122 is somewhat shorter than the outside diameter of baffle 128 and baffle 130 so that the baffles may be positioned within baffle chambers 123 and 123a and maintained in such position. The baffles may be maintained within the baffle chambers by any other means known to the art. Each baffle has at least one baffle opening 132. Openings 132 are provided in this form of the invention by making cuts around the circumference of the baffles as shown in FIGS. 9 and 11 so as to permit passageway between the baffles and the inner walls 122.

The baffles have a surface 128a on which impurities are deposited during the operation of the filter. Surface 128a is preferably spaced at 0.030 of an inch from the exit of nozzle exit means 106. In the filter illustrated in FIGS. 6 through 11 of the drawings, the nozzle structure including the first chamber 110 acts to speed up the flow of gas or smoke to a high velocity and then to atomize the flowing material between nozzle exit means 106 and baffle surface 128a. This action spreads the flow at high speed with atomization, drawing the flow from its normal straight downstream direction laterally and radially toward re-reverse curves 120 causing a spread of particles contained within the flow in a wide dispersion relative to baffle surface 128a. Particles within the flow will generally adhere to baffle surface 128a and, of course, some may fall and adhere to the walls 122 between baffle 128a and curves 120 and to other portions of the filter within this defined area. The smoke or gas which ultimately flows downstream through openings 132 will be relieved of considerable impurities by this action, and will be filtered to a marked degree as such smoke or gas leaves the mouthpiece portion 134 at the downstream end of the filter.

The foregoing construction including the nozzle chamber comprising symmetrically curved wall means curving from the wide entry portion and convexed toward the center of the body portion and extending in a downstream direction to the narrow throat portion, and then curving in a reverse direction to form the nozzle exit with an annular lip convexed downstream, together with the gradual reverse curve concaved downstream forming an annular inner wall and merging into the inner surface of the outer wall structure, has the advantages of providing an easy draw for the smoker with a smooth flow of smoke, and substantially reduces turbulence within the filter.

Each filter is provided with a mouthpiece 134. Mouthpiece 34 would be at the downstream end 94 or 94a respectively of each filter body portion.

Reference to FIG. 10 shows a pair of cigarettes which have been made in accordance with the invention with the baffle assembly 124 shown in dotted lines holding the pair together, mouthpiece to mouthpiece. At a final stage of manufacture, the baffle assembly 124 is cut on line 136 as shown in FIG. 6. Cutting the center post 126 on line 136 separates the two cigarettes which contain filters 100 and 102 respectively. This cut end of baffle post 126 is shown as reference numeral 138 in FIG. 11 of the drawings. Thus, at the end of the manufacture, there will be separate cigarettes 140 and 142 ready to be packaged and each containing a filter of the invention.

In the description of the filter illustrated in FIGS. 6 through 11 of the drawings, I have given certain precise measurements for the configuration of the first chamber 110, the throat 112, the nozzle exit means 106, and the distance of the baffle surface 128a from the nozzle exit as well as some other configurations of the body portion of the filter. These measurements may, of course, be varied within some limits without departing from the efficacy of this form of the filter. The configurations were designed to provide a high velocity to the nozzle and to provide turbulence and atomization to the gas flow at the nozzle exit. The following ranges of measurements should provide filters which operate satisfactorily:

| | Inches |
|---|---|
| Length of filter | >0.500 |
| Width of filter | .0250–.0750 |
| Distance between gas entry 104 and throat portion 112 | 0.300–0.575 |
| Curve 108 | 1.000–1.750 |
| Width of throat portion 112 | 0.020–0.030 |
| Reverse curve 116 radius | 0.025–0.050 |
| Distance from exit 106 to baffle surface 128a | 0.025–0.250 |

The foregoing measurements may be described in terms of "units" as set forth hereinbelow.

In the form of filter described at FIGS. 6 through 11 of the drawings, I may also provide auxiliary filtering material 54 such as that illustrated in FIG. 1 of the drawings in the portion between the downstream end 94 and the baffle 128.

While all of the above measurements have been given in inches, it is to be understood that the filter may be made in various sizes so long as the measurements and configurations of the parts are relative, in accordance with the above descriptions, to the size of the filter. The term "units" instead of "inches" may be used to define the various relative measurements of the parts of the filter. For example, instead of saying that a distance is 0.030 of an inch, I have defined such distance as 0.030 of a unit. This is to be understood to mean that the distance of each unit is relative to the distance of each other unit, whether the units be inches, feet, millimeters or based on any other system of measurement, and it is intended that the relative measurements cover any system of measurement which may be used in any given unit of measurement.

While I have described my invention in its preferred forms, there are other forms which it may take without departing from the spirit and scope of the invention.

Wherefore I claim:

1. A filter for a gas flow system having a main body portion comprising: an upstream end, a downstream end, and an outer wall structure, said main body portion further comprising a nozzle chamber having a relatively wide gas entry portion facing toward said upstream end of said main body portion, a relatively narrow nozzle gas exit portion facing toward said downstream end of said main body portion, and a throat portion in said nozzle chamber, narrower than said nozzle exit portion, positioned between said gas entry portion and said nozzle exit portion and relatively near said nozzle exit portion, together with baffle means mounted within said body portion; said nozzle chamber comprising symmetrically curved wall means curving from said wide gas entry portion and convexed toward the center of the body portion and extending in a downstream direction to said narrow throat portion, then curving in a reverse direction to form said nozzle exit portion with an annular lip convexed downstream, then continuing in an upstream direction leading to a second reverse gradual curving and concaved downstream to form an inner annular wall and merging into the inner surface of said outer wall structure to form a second chamber downstream of said first mentioned chamber, said second chamber having a downstream opening, said baffle means being mounted within said second chamber facing said nozzle exit portion with a surface thereof transverse to the normal direction of gas flow and with at least one opening associated with said baffle means to permit gas to flow in a downstream direction past said baffle means toward said downstream opening.

2. The filter as defined in claim 1, in which the main body portion is greater than 0.500 of an inch in length, and approximately 0.305 of an inch in width, and in which the distance between said wide gas entry portion and said throat portion is approximately 0.475 of an inch and the curve between said wide entry portion and said throat portion is on a radius of substantially 1.025 of an inch, with the diameter of said throat portion being approximately 0.021 of an inch, said first mentioned curve forming said nozzle exit portion, being on a radius of approximately 0.025 of an inch, and said surface of said baffle facing said nozzle exit portion being spaced approximately 0.030 of an inch from the end of said nozzle exit portion.

3. The filter as defined in claim 1, in which the main body portion is at least 0.500 of an inch in length, and approximately within the range of 0.250 of an inch to 0.750 of an inch in width, and in which the distance between said wide gas entry portion and said throat portion is approximately within the range of 0.300 of an inch to 0.575 of an inch, and the curve between said wide entry portion and said throat portion is on a radius of between 1.000 inch and 1.750 inches, with the diameter of said throat portion being approximately within the range of 0.020 of an inch to 0.030 of an inch, said first mentioned reverse curve forming said nozzle exit portion, being on a radius of approximately 0.025 of an inch to 0.050 of an inch, and said surface of said baffle facing said nozzle exit portion being spaced approximately within the range of 0.025 of an inch to 0.250 of an inch from the end of said nozzle exit portion.

4. The filter as defined in claim 1 in combination with means to attach said filter to a cigarette, cigar or the like, said filter including mouthpiece means.

5. The filter as defined in claim 4 including an end passageway between said baffle means and said mouthpiece means.

6. The filter as defined in claim 5, in which said end passageway between said baffle means and said mouthpiece means includes filter means.

7. A filter assembly comprising a pair of filters as defined in claim 1, in which said pair of filters are positioned with their downstream ends in facing abutment and the baffles of each of said pair of filters are comprised in a baffle assembly, said baffle assembly including post means connecting said baffles.

8. A pair of cigarettes comprising a filter assembly as defined in claim 7 and including a cigarette connected to each end of said filter assembly.

References Cited

UNITED STATES PATENTS

| | | | |
|---|---|---|---|
| 2,954,783 | 10/1960 | Lebert | 131—201 X |
| 3,351,072 | 11/1967 | Baum et al. | 131—10.5 X |
| 1,513,147 | 10/1924 | Zahariadis | 131—211 X |
| 1,921,073 | 8/1933 | England | 131—210 |
| 2,686,524 | 8/1954 | Kershaw et al. | 131—211 |
| 2,954,779 | 10/1960 | Lebert | 131—210 X |
| 3,062,218 | 11/1962 | Temkovits | 131—10.5 X |
| 3,269,394 | 8/1966 | Curtis | 131—201 X |
| 3,313,308 | 4/1967 | Grasso | 131—210 X |
| 3,318,312 | 5/1967 | Curtis | 131—10.7 X |
| 3,366,123 | 1/1968 | Brothers | 131—10.5 |

FOREIGN PATENTS

| | | |
|---|---|---|
| 283,044 | 9/1952 | Switzerland. |

ALDRICH F. MEDBERY, Primary Examiner

J. H. CZERWONKY, Assistant Examiner

U.S. Cl. X.R.

131—10.7, 201, 212, 261